United States Patent
Hill et al.

(10) Patent No.: US 9,424,471 B2
(45) Date of Patent: Aug. 23, 2016

(54) ENHANCED INFORMATION FOR VIEWER-SELECTED VIDEO OBJECT

(75) Inventors: Seth Guy Hill, La Mesa, CA (US); Djung Nguyen, San Diego, CA (US); Aravind Babu Asam, San Diego, CA (US); Xudong Yu, San Diego, CA (US); Nobukazu Sugiyama, San Diego, CA (US); Dongwook Kim, San Diego, CA (US); Eric Hsiao, San Diego, CA (US); Dipendu Saha, San Diego, CA (US); Tanmay Agnihotri, San Diego, CA (US); William Arthur Schupp, San Diego, CA (US)

(73) Assignee: Sony Corporation, Tokyo (JP)

(*) Notice: Subject to any disclaimer, the term of this patent is extended or adjusted under 35 U.S.C. 154(b) by 860 days.

(21) Appl. No.: 13/155,881

(22) Filed: Jun. 8, 2011

(65) Prior Publication Data
US 2012/0227074 A1    Sep. 6, 2012

Related U.S. Application Data

(60) Provisional application No. 61/447,804, filed on Mar. 1, 2011.

(51) Int. Cl.
| H04N 5/445 | (2011.01) |
| G06K 9/00 | (2006.01) |
| H04N 21/422 | (2011.01) |
| H04N 21/462 | (2011.01) |
| H04N 21/4725 | (2011.01) |
| G06Q 30/06 | (2012.01) |

(52) U.S. Cl.
CPC ...... *G06K 9/00671* (2013.01); *H04N 21/42224* (2013.01); *H04N 21/4622* (2013.01); *H04N 21/4725* (2013.01); *G06Q 30/0601* (2013.01)

(58) Field of Classification Search
CPC combination set(s) only.
See application file for complete search history.

(56) References Cited

U.S. PATENT DOCUMENTS

| 2007/0124766 | A1 | 5/2007 | Relan et al. |
| 2008/0021906 | A1* | 1/2008 | Lunenfeld ................. 707/10 |
| 2008/0098432 | A1* | 4/2008 | Hardacker et al. ........... 725/51 |
| 2008/0109851 | A1* | 5/2008 | Heather et al. ............. 725/60 |
| 2009/0015703 | A1 | 1/2009 | Kim et al. |
| 2009/0120268 | A1 | 5/2009 | Joung et al. |
| 2012/0167145 | A1* | 6/2012 | Incorvia ................. 725/60 |

FOREIGN PATENT DOCUMENTS

| EP | 2224321 | 9/2010 |
| WO | 2008085742 | 7/2008 |

* cited by examiner

*Primary Examiner* — Chenea Smith
(74) *Attorney, Agent, or Firm* — John L. Rogitz

(57) ABSTRACT

The user of an Internet-enabled CE device such as a TV can select an object in a video presented on the display of the CE device by either touch sensitive screen or input device. The processor of the CE device can then determine the boundaries of the object, identify it using face/image recognition software, search for information/websites related to the object, and present those information/websites to the viewer on the display screen.

16 Claims, 4 Drawing Sheets

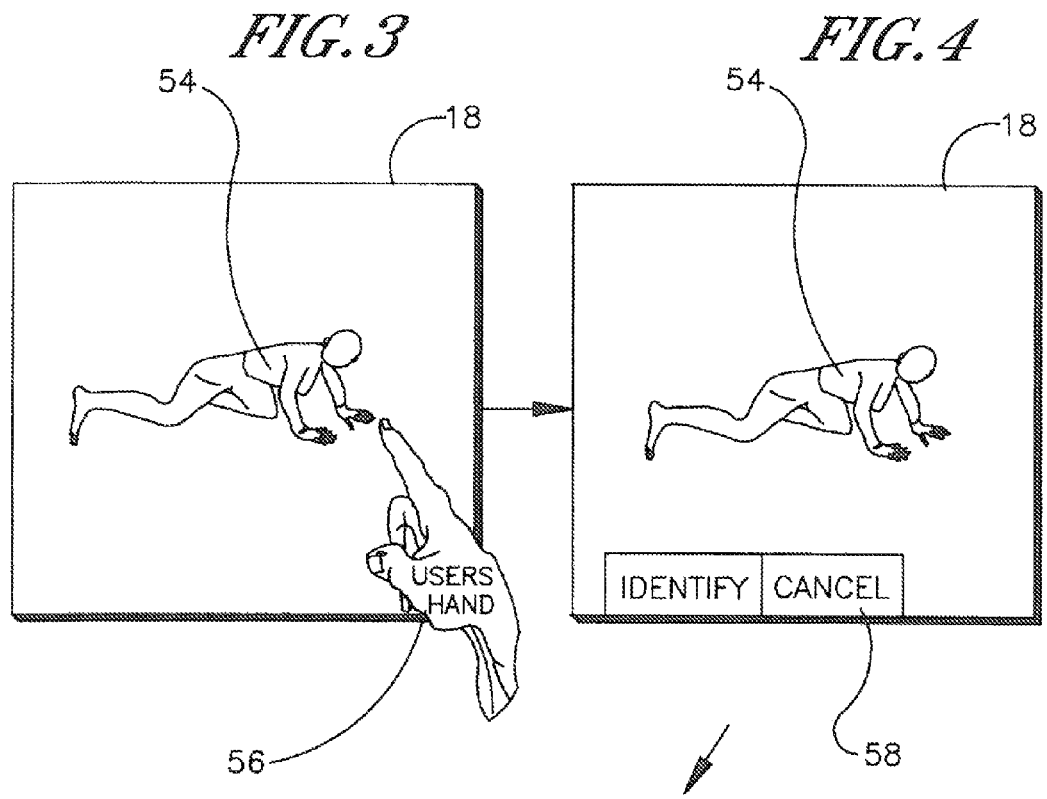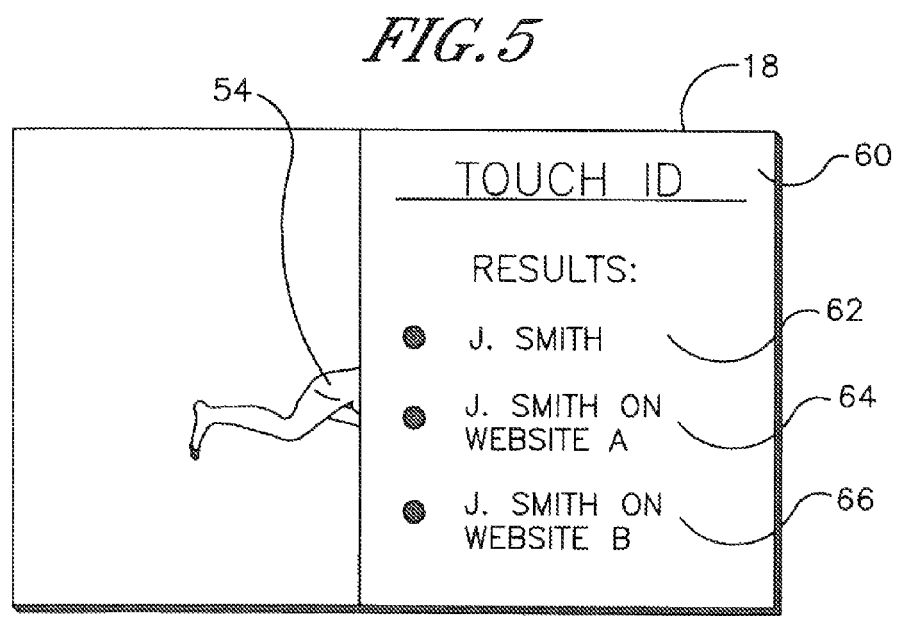

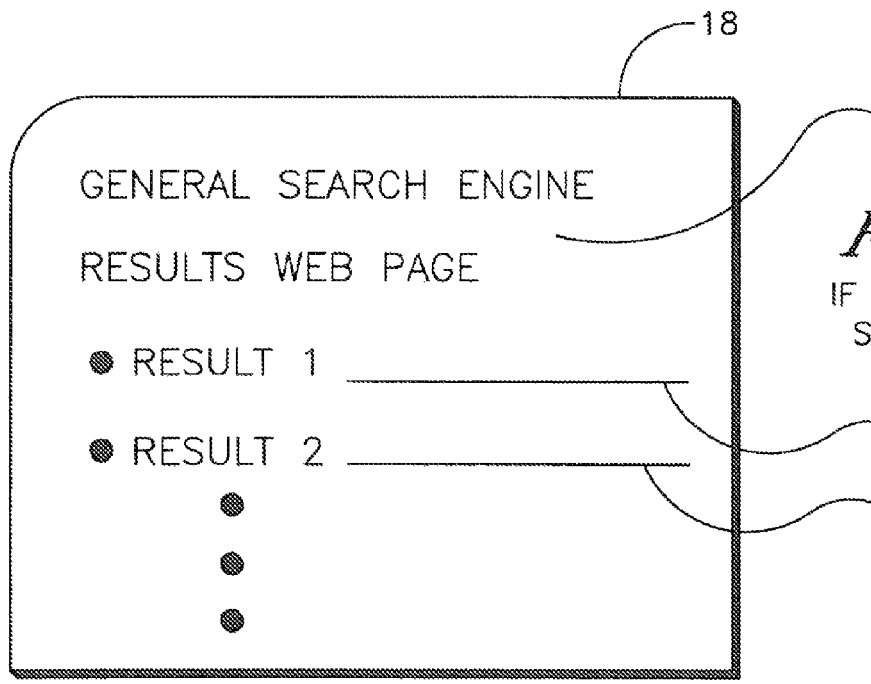
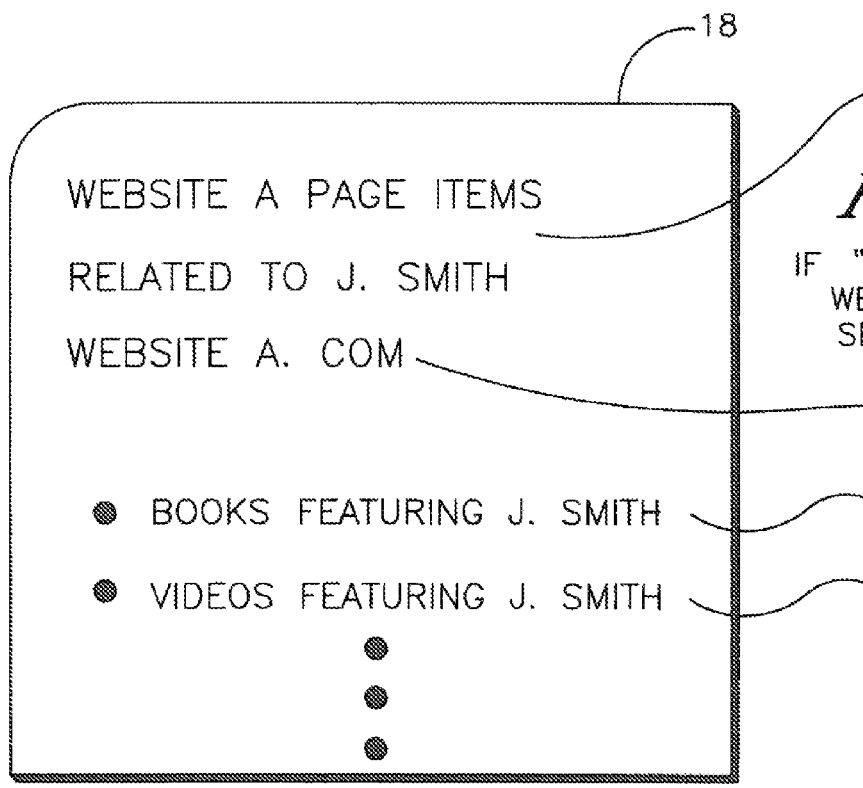

ENHANCED INFORMATION FOR VIEWER-SELECTED VIDEO OBJECT

This application claims priority to U.S. provisional application Ser. No. 61/447,804, filed Mar. 1, 2011.

FIELD OF THE INVENTION

The present application relates generally to providing enhanced information for viewer-selected video objects presented on displays of consumer electronics (CE) devices such as TVs, smart phones, and the like.

BACKGROUND OF THE INVENTION

Movies, TV shows, Internet videos, other videos, etc., are watched by millions of people on a daily basis. Often a viewer of a video sees a particular person, product, object, etc., and would like to learn more about that person/object or purchase something related to the person/object, i.e. a book. The viewer in many cases uses the Internet to search for more information related to the person/object or for products in online stores.

Touch sensitive displays that allow users to select an area of the display screen by simply touching the screen with a finger or pointing tool are readily available on the market. Face/image recognition software is also readily available and can identify an object be examining the pixels extracted and associated with a specific object. However, the linkage of touch sensitive displays and recognition software directly to online stores or websites does not exist.

SUMMARY OF THE INVENTION

Accordingly, a CE device includes a housing, a display on the housing, a network interface, and a processor in the housing controlling the display and communicating with the Internet through the network interface. The processor executes logic that includes presenting video on the display and receiving a user selection of an area of the display. Furthermore, the processor uses image recognition and determines an object in the area of the display, the object being part of the video. The processor then correlates the object to basic information relating thereto and presents the basic information on the display. Along with the basic information, the processor presents a first user interface (UI) on the display usable by a person to select additional information pertaining to the object.

If the object in the area of the display selected by the user is a person, the processor determines the identity of the person using a face recognition engine. The basic information related to the person selected includes the name of the person. Alternatively, the object selected can be a product, in which case the processor determines what the product is using an image recognition engine. The basic information related to the product includes a name and manufacturer of the product.

The display of the CE device can be a touch sensitive display and the user selection of an area of the display can be a tactile touch on the display. In other implementations, the display may not be a touch sensitive display and the user selection of an area of the display is a screen cursor selection. In either implementation, the processor of the CE device is responsive to the user selection of an area of the display. The processor's response is presentation of a second UI on the display that enables a person to select to identify the object prior to using image recognition to determine the object in the area of the display. The first UI enables selection of a general search engine pertaining to the object and selection of a search related to the object on a predetermined vendor web site which, if selected, returns only results pertaining to the object available on the vendor web site.

In another aspect, a method includes presenting a video stream on a touch sensitive display and receiving a touch signal from the display representing a display location. Responsive to the touch signal, an identity of an object in the video stream at the display location is determined. In turn, responsive to determining the identity, information related to the object is presented.

In another aspect, a CE device has a touch sensitive display and a processor controlling the display. The processor executes logic including presenting video on the display, receiving from the display a user selection of an area of the display, and determining an object in the area of the display. The object is part of the video and the logic includes presenting information on the display pertaining to the object.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3-5 are a series of example screen shots illustrating information selection steps from FIG. 2; and FIGS. 6 and 7 are example screen shots showing results of certain selections from FIG. 5.

DETAILED DESCRIPTION OF THE PREFERRED EMBODIMENT

Figure 1:
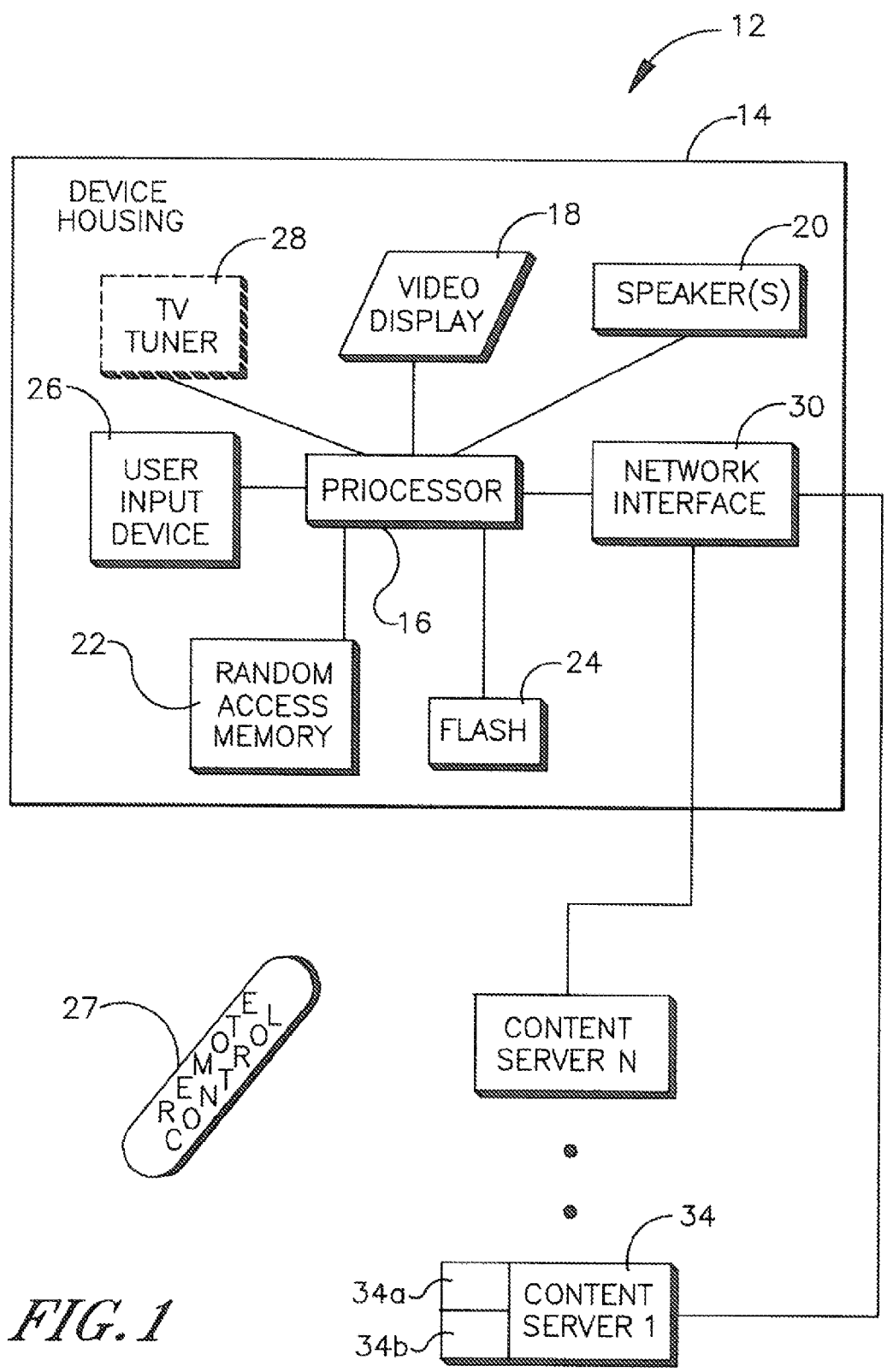
FIG. 1 is a block diagram of an example system in accordance with present principles.

Referring initially to FIG. 1, a consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The visual display may be a touch sensitive display.

To undertake present principles, the processor 16 may access one or more computer readable storage media such as but not limited to RAM-based storage 22 (e.g., a chip implementing dynamic random access memory (DRAM)) and/or flash memory 24 and/or disk-based storage. Software code implementing present logic executable by the CE device 12 may be stored on one of the memories to undertake present principles.

If desired, in addition to the touch sensitive display the processor 16 can receive user input signals from various input devices, including a keypad 26, a remote control device 27, a point and click device such as a mouse, a keypad, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to one or more content servers 34. The servers 34 have respective processors 34*a* and respective computer readable storage media 34*b*.

Figure 2:
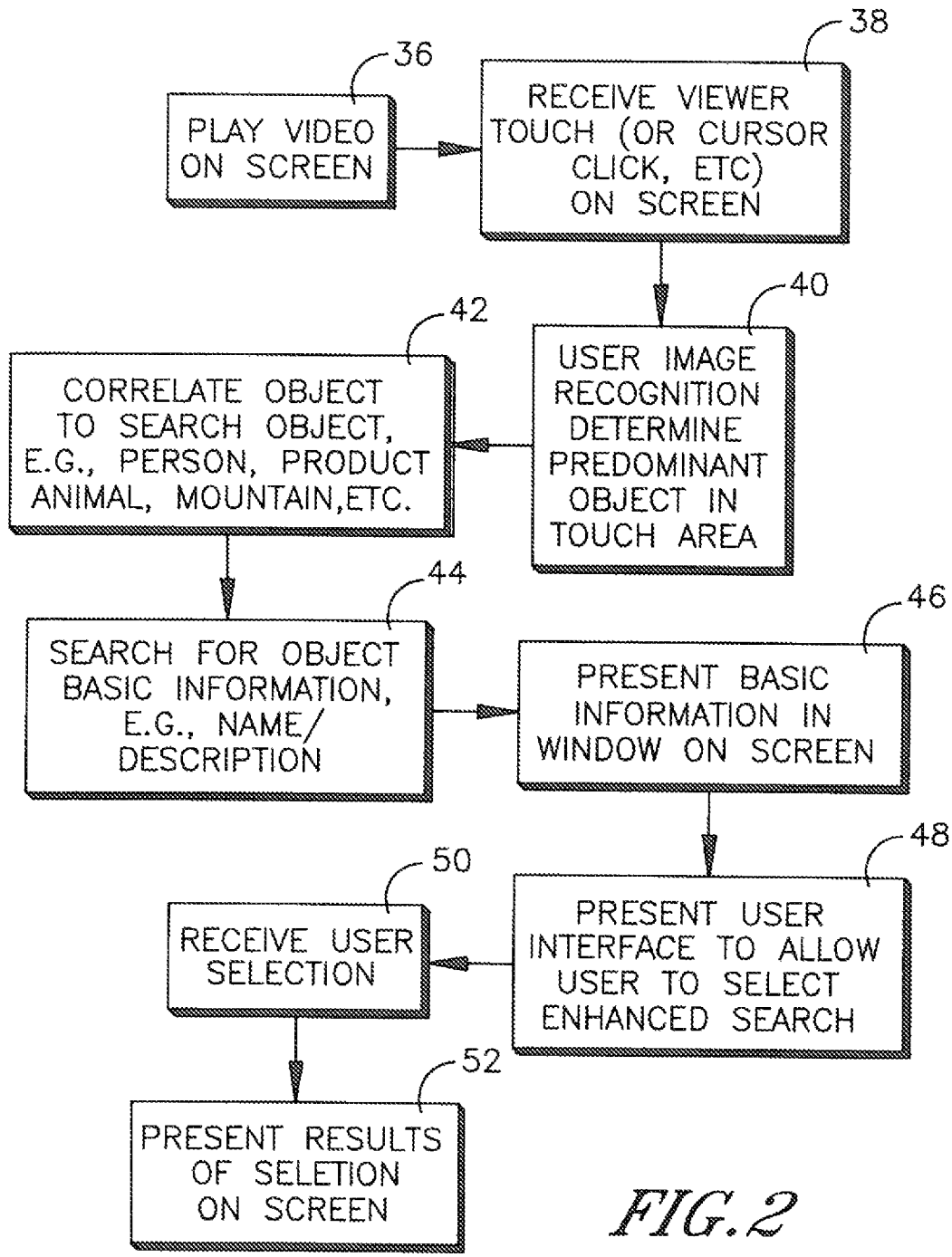
FIG. 2 is a flow chart of example logic in accordance with present principles.

FIG. 2 shows example logic in the form of a flow chart beginning at block 36, which represents playback of video on a visual display screen 18 under the direction of the processor 16. While the video is playing, the processor 16 receives the user's selection of an area of the display screen 18 via, in the case of a touch sensitive display, the user touching it with a finger or other pointing tool at block 38. In another implementation, the processor 16 may receive the user area selection via various input devices, including a keypad 26, a remote control device 27, a point and click device such as a mouse, a keypad, etc. Further, the user may elect to identify the selected object by inputting keywords via an input device 30.

Once the processor 16 receives the user's touch area, it will determine the predominant object in the touch area using face/image recognition engine at block 40. The processor 16 correlates the touched area to the corresponding area in the video, extracts pixels from that video area, and executes the face/image recognition on those extracted pixels. Using image recognition the processor 16 can determine what the object is by initially discerning a boundary around the object as indicated by sudden pixel color or brightness changes. Once the boundary of an object is determined, the processor 16 can then process the pixels inside the boundary using face/image recognition in order to identify the object, i.e. an actor, product, animal, mountain, etc. and correlate it to an Internet searchable object at block 42.

Once the processor 16 has identified the object and correlated it to keywords used in Internet search, it can search for basic information related to the object, i.e. name/description, via network interface 30 at block 44. The processor 16 can present the basic information related to the identified object obtained via network interface 30 in a window on the video display 18 at block 46.

A user interface can also be presented under the direction of the processor 16 to allow the user to select an enhanced search at block 48. The processor 16 can receive the user's selection of an enhanced search and the information entered into the enhanced search via user input device 26, such as a remote control 27, at block 50. The results of an Internet-based search via network interface 30 will be obtained based on user entered information entered in the enhanced search and presented on the video display 18 at block 52.

Now referring to FIG. 3, the video display 18 is a touch screen display and presents an object 54 under the direction of the processor 16 that can be selected by the user touching the display 18 with a hand 56. In other implementations, the tool used to select the object 54 can be a touch screen friendly pointing tool. Alternatively, the video display 18 may not be a touch sensitive display, i.e. non-touch screen TV, in which case the object 54 can be selected with the use of an input device 26 such as a wireless or wired mouse, etc. In the example embodiment shown, the object 54 is a person and the selection tool is the user's hand 56. Once the area of selection is received by the processor 16, the boundaries of the object 54 can be determined by the processor 16.

FIG. 4 illustrates the response by the processor 16 to the selection of an area or object 54. A selector element 58 presented on the display screen 18 by the processor 16 allows the user to elect to identify the object 54 or to cancel the action of area selection described in FIG. 3. The user can enter keywords in order to identify the object 54 prior to the processor 16 using face/image recognition software.

Moving in reference to FIG. 5, the results of the processor 16 identifying the object 54 can be presented on the video display 18 under the direction of the processor 16 in the form of a user interface window 60 with selector elements 62, 64, 66. The user may select one of the selector elements 62, 64, 66 with the user's hand 56 in the case of a touch sensitive screen. The processor 16 can receive the user's selection and proceed to provide additional information and search results based on the user's selection.

FIG. 6 illustrates the presentation of a user interface window 68 under the direction of the processor 16 in response to the user's selection of selector element 62. The processor 16 can present results in the form of a list of selector elements 70*a*, 70*b* that can be websites containing general information related to the title of the identified object 54. The processor 16 searches for results, here, websites, and can present them via network interface 30.

Alternatively, selector element 64 can be selected by the user, in which case the processor 16 presents a menu 72 pertaining solely to a particular website 74 that allows the user to select specific elements presented in the form of selector elements 76*a*, 76*b*, as shown in FIG. 7. In the example embodiment, the selector element 76*a* links to books featuring the object 54 previously selected and the selector element 76*b* links to videos featuring videos featuring the object 54. The books and videos featuring the object 54 may be available for purchase through an online store.

While the particular ENHANCED INFORMATION FOR VIEWER-SELECTED VIDEO OBJECT is herein shown and described in detail, it is to be understood that the subject matter which is encompassed by the present invention is limited only by the claims.

What is claimed is:

1. CE device comprising:
   display;
   network interface;
   processor controlling the display and communicating with the Internet through the network interface;
   the processor executing logic including:
   presenting video on the display;
   receiving a user selection of an area of the display;
   using image recognition, determining an object in the area of the display, the object being part of the video;
   correlating the object to basic information relating thereto;
   presenting the basic information on the display; and
   along with the basic information, presenting a first user interface (UI) on the display usable by a person to select additional information pertaining to the object, wherein the first UI includes a general search engine selector element selectable without a user typing in an Internet address to automatically launch a general Internet search for the additional information pertaining to the object, the UI also including at least one website search selector element selectable to automatically launch a search for the additional information pertaining to the object only on a predetermined web site that is not a general search engine web site such that if the website search selector element is selected only results pertaining to the additional information pertaining on the predetermined web site are returned for presentation on the display.

2. The CE device of claim 1, wherein the object is a person, the processor determining who the person is using a face recognition engine, the basic information including a name of the person.

3. The CE device of claim 1, wherein the object is a product, the processor determining what the product is using an image recognition engine, the basic information including a name and manufacturer of the product.

4. The CE device of claim 1, wherein the display is a touch sensitive display and the user selection of an area of the display is a tactile touch on the display.

5. The CE device of claim 1, wherein the user selection of an area of the display is a screen cursor selection.

6. The CE device of claim 1, wherein responsive to the user selection of an area of the display, a second UI is presented on the display enabling a person to select to identify the object prior to using image recognition to determine the object in the area of the display.

7. Method, comprising:
presenting a video stream on a touch sensitive display;
receiving a touch signal from the display representing a display location;
responsive to the touch signal, determining an identity of an object in the video stream at the display location;
responsive to determining the identity, presenting information related to the object;
along with the information, presenting a first selector which when selected by a user allows a user to search for additional data related to the object from one and only one website, and simultaneously presenting a second selector which when selected by the user allows the user to search for additional data related to the object by invoking a general Internet search engine; and
responsive to user input selecting the first selector automatically searching the one and only one website for the additional data and responsive to user input selecting the second selector, automatically searching the Internet using a general Internet search engine for the additional data.

8. The method of claim 7, wherein the information is presented on the display.

9. The method of claim 7, wherein the object is a person.

10. The method of claim 7, wherein the object is not a person.

11. CE device comprising:
touch sensitive display; and
processor controlling the display;
the processor executing logic including:
presenting video on the display;
receiving from the display a user selection of an area of the display;
determining an object in the area of the display, the object being part of the video;
presenting information on the display pertaining to the object; and
along with the information, presenting a first user interface (UI) on the display usable by a person to select additional information pertaining to the object, wherein the first UI enables selection of a general search engine pertaining to the object and simultaneously enables selection of a search related to the object on a predetermined vendor web site which if selected returns only results pertaining to the object available on the vendor web site.

12. The CE device of claim 11, wherein the object is a person, the processor determining who the person is using a face recognition engine, the information including a name of the person.

13. The CE device of claim 11, wherein the object is a product, the processor determining what the product is using an image recognition engine, the information including a name and manufacturer of the product.

14. The CE device of claim 11, wherein the display is a touch sensitive display and the user selection of an area of the display is a tactile touch on the display.

15. The CE device of claim 11, wherein the user selection of an area of the display is a screen cursor selection.

16. The CE device of claim 11, wherein responsive to the user selection of an area of the display, a second UI is presented on the display enabling a person to select to identify the object prior to using image recognition to determine the object in the area of the display.

* * * * *